Figure 1:
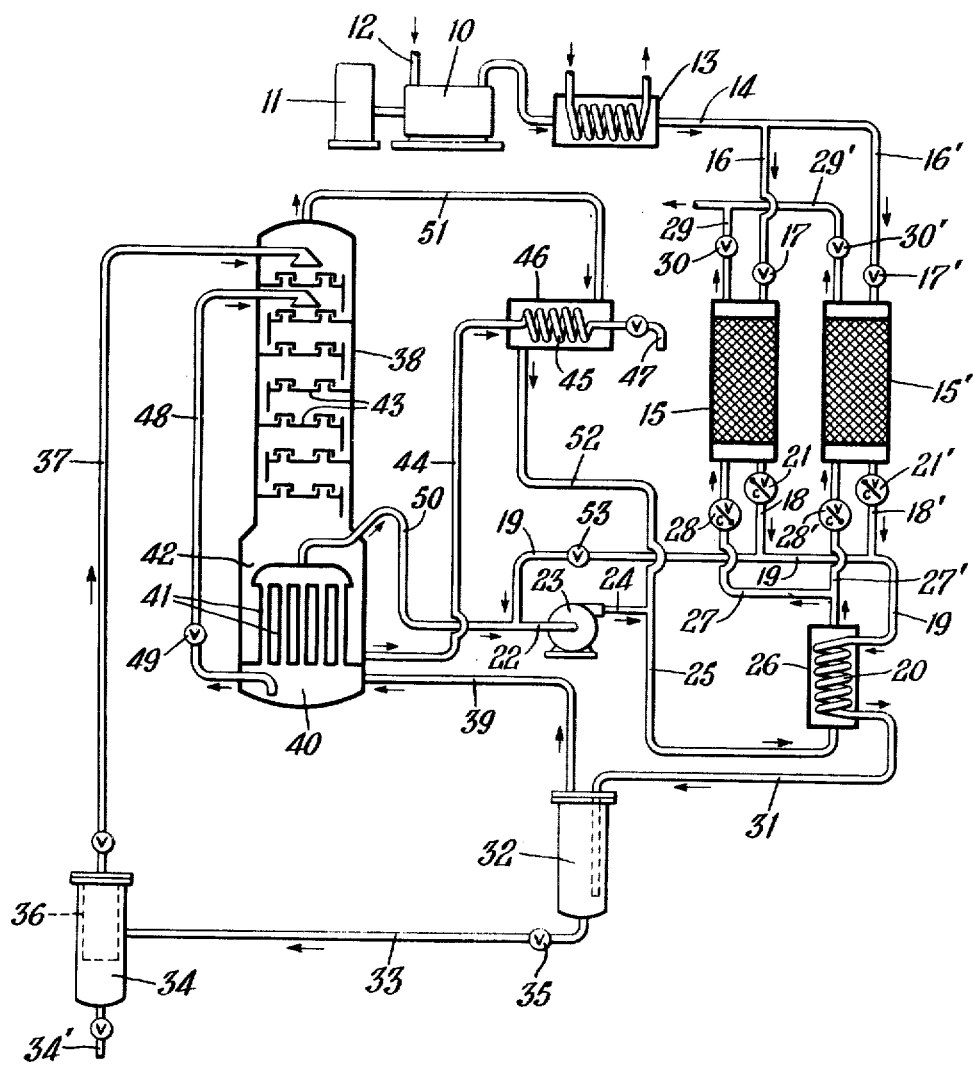

INVENTORS
EDWARD F. YENDALL
GEORGE H. ZENNER
ATTORNEY

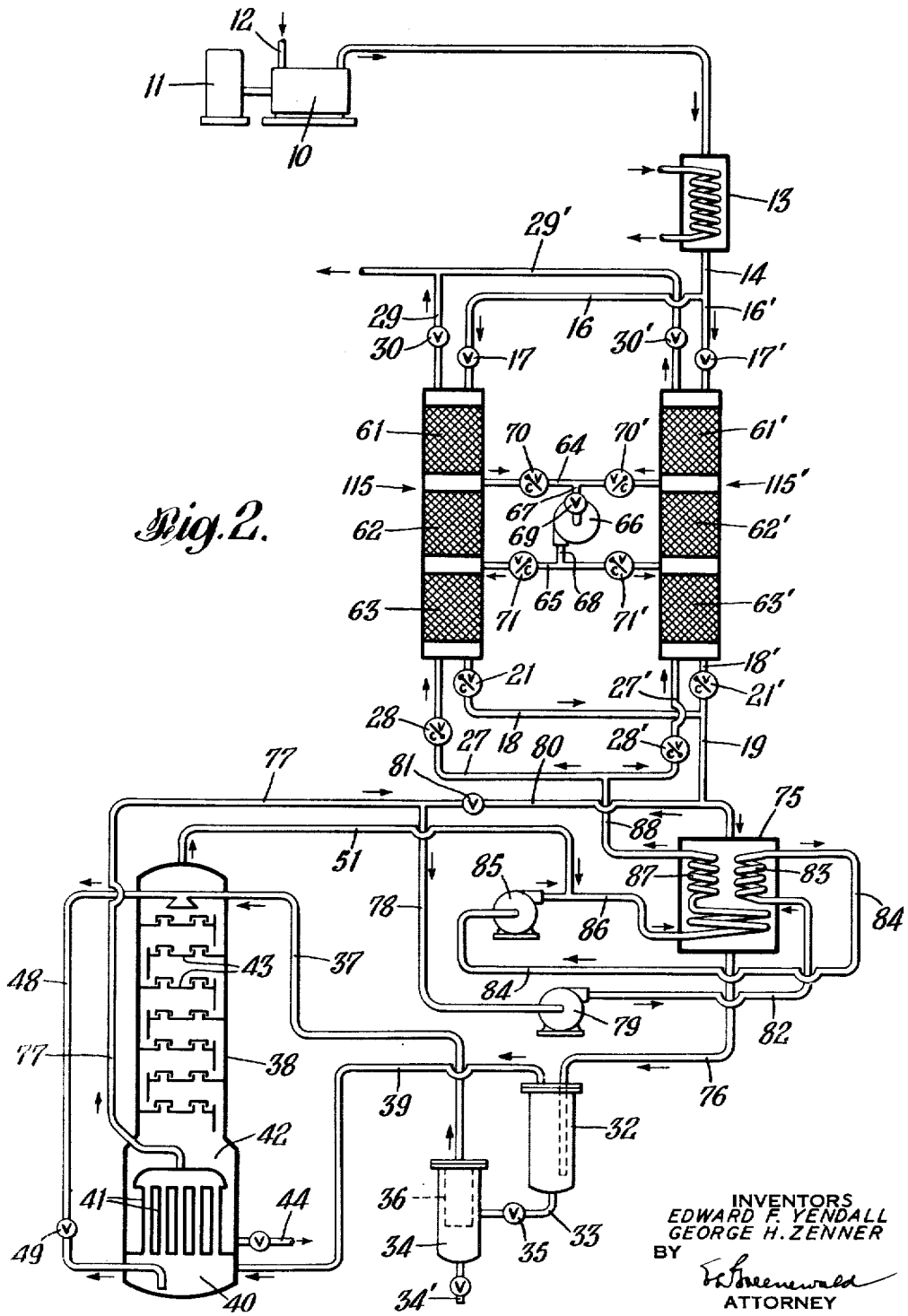

Patented Aug. 15, 1950

2,518,652

UNITED STATES PATENT OFFICE 2,518,652

PROCESS OF AND APPARATUS FOR SEPARATING GAS MIXTURES

Edward F. Yendall and George H. Zenner, Kenmore, N. Y., assignors to The Linde Air Products Company, a corporation of Ohio Application December 13, 1944, Serial No. 567,950

30 Claims. (Cl. 62—175.5)

This invention relates to a process of and apparatus for separating gas mixtures, and more particularly to a process of and apparatus for separating air to recover oxygen in the liquid state.

Oxygen in the liquid state is customarily produced in large stationary plants by a process requiring the compression of the air to high pressures such as 2000 to 3000 p. s. i. (pounds per square inch gauge pressure). Such pressures require the use of four stages or more of compression and the compressors and intercoolers employed are necessarily large and heavy. The other high pressure equipment such as traps, heat exchangers, and expansion engines are likewise of heavy construction. Plants operating at such high pressures necessarily involve high investment costs and with air at such high pressures, there is considerable difficulty in maintaining the apparatus free of leaks so that the maintenance expenses in such plants are also relatively high.

Low pressures such as 75 p. s. i. are commonly used for a large part only of the air handled in gaseous oxygen plants. This pressure is required to effect condensation of nitrogen by heat exchange with oxygen boiling at about atmospheric pressure in the common double column used for oxygen production. A minor part of the air is usually compressed to a high pressure such as 2000 p. s. i. and expanded with or without external work to furnish refrigeration for such a cycle. It has also been proposed to furnish refrigeration for gaseous oxygen production in large plants by expanding to atmospheric pressure with the production of external work a part of the air compressed to 75 p. s. i. This has the advantage of allowing all the air to be compressed in a single rotary compressor, and results in a marked reduction in maintenance costs. However, the refrigeration required for the production of liquid oxygen is about 10 times that required for the production of gaseous oxygen. Therefore it has been customary to employ very high pressures which are more readily adapted to the production of refrigeration in liquid oxygen producing plants. However, it has been discovered that as the capacity of liquid oxygen plants increases, and the efficiency of rotating equipment improves, it becomes advantageous to produce liquid oxygen at pressures adaptable to such machinery.

By the principles of the present invention, low pressure equipment may be employed for the production of liquid oxygen in such a manner that a minimum of equipment is required. Therefore the low investment and maintenance costs inherent in low pressure rotating machinery are enhanced by the reduced amount of cooperating equipment required. Among the main features of this simplification are the steps of superheating a pressure product of the rectification by direct mixture with warmer pressure gas, thereby eliminating a heat exchanger, and the partial condensation of a vapor to produce a liquid fraction so rich in oxygen that pure oxygen may be produced from it in a relatively simple rectifying column.

Objects of the present invention therefore are to provide an improved process of and apparatus for separating a mixture of gases having low boiling points such as air: which avoids the difficulties of high pressure processes by requiring the compression of the gas mixture only to a relatively low pressure of below about 125 p. s. i. and preferably about 75 p. s. i. gauge; which employs compression and gas handling equipment that may be compactly arranged and be of relatively light weight; which permits an important reduction in the gas handling equipment required by eliminating the need of a large heat exchanger; which permits a relatively simple type of rectifying column to be employed efficiently; and which can be conveniently employed in a portable plant for the production of a liquefied gas such as liquid oxygen.

These and other objects and advantages of this invention will become apparent from the following description and the accompanying drawings, in which the figures are diagrammatic views showing two exemplary embodiments of apparatus for carrying out the processes of the invention, particularly for the separation of air to produce liquid oxygen; and wherein;

Fig. 1 is a diagrammatic view of an apparatus according to the invention which employs a single expansion turbine in the most compact arrangement; and Fig. 2 is a diagrammatic view of a modified arrangement of the apparatus that employs expansion turbines in a staged relation to obtain high efficiency.

According to the invention which will be described for the separation of air to produce liquid oxygen, air in larger amount than the amount of air to be separated is compressed by a turbocompressor to a pressure between 70 and 125 p. s. i. and preferably to a pressure of about 75 p. s. i. gauge. The moisture in the air is removed substantially completely by deposition as frost in cold accumulators. The dried air is then further cooled by heat exchange with outgoing products to a low temperature. A major portion of the cold air is expanded with the production of external work in an expansion motor preferably of the turbine type to cool it substantially to its condensation temperature and passed together with the outflowing nitrogen product of separation through the cold accumulator system for cooling more of the inflowing compressed air. A minor portion of the cooled compressed air which has been liquefied by indirect heat exchange with the expansion motor exhaust gas and with oxygen boiling at the lower end of the column is employed as reflux liquid in the rectifying column. Usually some carbon dioxide and certain condensable impurities in the air will pass through the heat exchangers. Such impurities are removed from the portion of air to be separated by passage of the liquid fraction through filters which remove the solidified impurities before the filtered liquid is passed into the rectifying column. The liquid oxygen product collects in and is removed from the lower part of the column and a nitrogen product passes from the upper end of the column.

When air to be separated is compressed only to pressures below 125 p. s. i., practically no useful refrigeration can be obtained by throttle expansion since the room temperature Joule-Thompson effect is negligible at such pressures, thus if the use of separate additional refrigeration machines are to be avoided, all the refrigeration must be obtained by expansion with the production of external work. Also when the oxygen product is to be removed in liquid state, the refrigeration contained in the liquid oxygen product must be provided by such expansion with external work. For these reasons a larger volume of air is expanded preferably in a turbine to produce all the refrigeration necessary for the rectification of a smaller volume of the compressed air to produce liquid oxygen. Such low pressure air separation cycles have a higher power cost than the more efficient high pressure separation cycles due mainly to increased frictional losses in heat exchangers caused by the air having a larger volume at the lower pressure and by the necessity of effecting heat exchange between streams of air having a much larger volume than the volume of the air rectified.

An advantage of the low pressure however is that it permits the use of a turbo-compressor and turbo-expander or expanders which are compact and light in weight for the amount of air handled and which can be mounted in a compact unit with a prime mover, for example with the shaft of an electric motor or steam turbine directly coupled to the turbo-compressor and the turbo-expander all designed to turn at the same high speed. A second advantage is that the low pressure permits the use of cold accumulator type of heat exchangers which not only provide a smaller warm end temperature difference between the inflowing compressed air and the outflowing gases and interpose much less resistance to flow, but also remove the moisture from the air without refrigeration loss. When producing liquid oxygen however, the refrigeration removed from the system in the liquid oxygen causes the cold accumulator to operate unbalanced. This unbalanced condition is partially offset by the large volume of expanded air passed out with the nitrogen product. Complete removal of all the carbon dioxide and other condensable impurities is not obtained in the cold accumulators and therefore a scrubber-filter arrangement is preferably employed for impurity removal.

In one embodiment of the invention the compressed air is cooled in cold accumulators to a low temperature above its condensation temperature, a large part is turbine expanded to reduce its temperature to the condensation temperature at the low pressure and such expanded air is used to cool and partly liquefy the remainder of the air which is separated into a liquid fraction and a gas fraction. The liquid fraction is filtered to remove impurities and passed to a rectification column for use as reflux liquid. The gas fraction is passed into a condenser in the base of the column that condenses part of the gas fraction to be transferred to the upper part of the column as reflux liquid and the uncondensed remainder of the gas fraction is passed while at the initial compression pressure to the inlet of the expansion turbine.

The single expansion motor, operated to discharge air in a dry and saturated vapor state, produces refrigeration in a temperature range which is both above and below the condensation temperature of the compressed air. The quantity of air passed through the turbine must be such that the total refrigeration available below the condensation temperature of the compressed air is roughly equivalent to the latent heat requirement of the liquid oxygen produced. It is found with pressures of the order of 75 p. s. i., normal expansion turbine efficiencies, and the quantity of expanded air determined above, that the part of the refrigeration available above the condensation temperature of the compressed air is roughly equivalent to the desuperheating requirement of the liquid oxygen produced. Thus a single turbine of normal efficiency operating with a head pressure determined by the rectifying column is found to produce refrigeration in proportions which can be used effectively in the production of liquid oxygen. Because of this an efficiency is attained which is surprisingly good for so simple an arrangement of equipment.

A second embodiment of the invention, according to Fig. 2, can be used to gain an increase in power efficiency. The cycle of Fig. 1 balances from the standpoint of supplying the latent heat and superheat requirements of the product in proper proportions. The embodiment of Fig. 2 allows a balance to be made in three temperature ranges which are: the latent heat range, a lower superheat range, and an upper superheat range. It has been discovered that a two-stage low temperature expansion engine supplying the latent heat requirement will not supply the full superheat load when an initial pressure of 75 p. s. i. is used and dry and saturated exhaust conditions are maintained on each stage, and that if the additional superheat load is supplied by a second expansion engine working in a higher temperature range, a marked increase in overall power economy results.

Referring now to the drawings and particularly to Fig. 1, a turbo-compressor is diagrammatically indicated at 10 directly coupled to a prime mover such as a steam turbine 11. The compressor has an air inlet 12 and discharges through an after-cooler 13. The discharge line 14 conducts the compressed air from the after-cooler to either one or the other of cold accumulators 15 and 15', which are similar to those described in United States Patent No. 1,989,190 of M. Fränkl, and are arranged in duplicate so that the flow through each may be periodically reversed. The inflowing air being cooled deposits moisture in the accumulator mass and such accumulated moisture is evaporated and carried out during the subsequent period by the dry outflowing nitrogen and expanded air. The discharge line 14 is connected to either of the warm ends of the cold accumulators by branch passages 16 or 16' controlled by reversing valves 17 and 17'. The cold ends of the accumulators 15 and 15' are joined by branch conduits 18 and 18' and a conduit 19 to a heat exchanger liquefying coil 20 and to the inlet 22 of an expansion turbine 23, the conduits 18 and 18' being controlled by check valves 21 and 21'. The expansion turbine 23 may have its power output shaft coupled to a power absorbing device (not shown) or may preferably be coupled by suitable transmission means not shown to the shaft of the turbo-compressor 10. The discharge of expanded air from the expansion device 23 is conducted by an outlet 24 and a conduit 25 to the cold end of a countercurrent heat exchanger passage 26 that surrounds the liquefier coil 20.

From the heat exchange passage 26 the expanded air, containing also a nitrogen product, is conducted by branch conduits 27 and 27' to the cold ends of the cold accumulators 15 and 15'. The conduits 27 and 27' have check valves 28 and 28' therein permitting flow only in the direction toward the cold accumulators. The warmed expanded air and nitrogen product leaves the cold accumulators through branch conduits 29 and 29' which are controlled by reversing valves 30 and 30'.

The portion of the compressed air which has been further cooled and partly liquefied in the liquefier coil 20 is conducted by conduit 31 to a separator trap 32 which serves to separate the liquefied fraction from the fraction remaining in the gas phase. The liquid fraction, which contains the solid carbon dioxide and other impurities that may have not been completely removed by the cold accumulators 15 and 15', is passed by a conduit 33 to a filter 34. The filter is preferably provided with a clean-out drain 34'. The conduit 33 has an expansion valve 35 therein in order to reduce the pressure of the filtered fraction substantially to the pressure of rectification which is very close to atmospheric pressure. After passing through a filter element 36 in the filter 34, the filtered liquid fraction is conducted by a transfer conduit 37 to the upper end of a rectifying column 38 to act as reflux for the column. The gas fraction is conducted from the separator 32 by a conduit 39 to a chamber 40 which is at the bottom of a set of condenser tubes 41 located in a vaporizing chamber 42 at the lower end of the rectifying column 38. The chamber 40 communicates with the interior of the tubes 41.

The rectifying column 38 is generally of customary construction and contains a series of gas and liquid contact devices such as rectifying trays 43. A liquid comprising substantially pure liquid oxygen collects in the chamber 42 from which it is withdrawn by a conduit 44 at a rate which maintains a constant level of liquid in the sump 42. The liquid oxygen product may preferably be subcooled to prevent flashing of portions thereof into vapor when it is transferred to a storage container or to transport apparatus. To this end the conduit 44 conducts the liquid to a heat exchanger passage or coil 45 within a heat exchanger 46. The subcooled liquid oxygen is discharged from the coil 45 through a valve controlled outlet 47.

A portion of the compressed air which passes through the tubes 41 is condensed by heat exchange with the liquid oxygen in the sump 42 and such condensate collects in the chamber 40 from which it is transferred by a line 48 controlled by an expansion valve 49 to the upper end of the rectifying column. The non-condensed portion of the compressed air passing through the tubes 41 is conducted by a conduit 50 to the inlet 22 of the expansion turbine 23. A product of greater nitrogen content than air is withdrawn from the upper end of the rectifying column 38 through a conduit 51 which conducts it to one end of the heat exchanger 46 for cooling the coil 45 and a conduit 52 conducts such product to the conduit 25 for admixture with the expanded air from the turbine 23. A control valve 53 is preferably interposed in the conduit 19 to regulate the proportion of air which passes to the expansion turbine and which passes from thence to the liquefier heat exchanger 26.

When the apparatus shown in Fig. 1 is in operation after the starting up period and conditions have reached a steady state, the air which is compressed by the turbo-compressor 10 to a pressure of about 75 p. s. i., passes for a period of time through accumulator 15 while valve 17 is open and valve 17' is closed. The compressed air is progressively cooled by its passage through the heat storage material in the cold accumulator until it has a temperature in the region of about 100° K. At a certain zone of the accumulator, moisture will be deposited in the form of frost and in a colder zone most of the carbon dioxide not previously removed from the air will be deposited. Some of the carbon dioxide however may be carried in suspension by the cold air. Minute amounts of solidifiable hydrocarbon impurities will also be entrained in the air. About two-fifths of the compressed and cooled air is passed through the liquefier 20 which liquefies a large portion of it. The liquid and gas fractions are separated by the separator 32 which may also act as a scrubber to insure thorough washing of the gaseous fraction by the liquid fraction so that all the impurities carried by the air will collect in the liquid fraction. The liquid fraction is expanded through valve 35, filtered by passage through the filter element 36, and then passed into the rectifying column through conduit 37. The amount of the liquid fraction which still remains in the liquid state after expansion through the valve 35 and passes into the column 38 as reflux liquid is roughly the same as the amount of the liquid oxygen which can be withdrawn through the conduit 44.

The gas fraction passes through the conduit 39, chamber 40, and the tubes 41 and furnishes heat for the lower end of the rectifying column to produce vapors which pass upward through the column and remove nitrogen from the descending liquid. Such vaporization of liquid oxygen in the sump 42 condenses a corresponding amount of liquid air in the tubes 41 which collects in the chamber 40 and is passed by line 48 after expansion through valve 49 to the upper end of the rectifying column. The amount of liquid remaining in the material transferred through the conduit 48 after expansion, roughly represents the amount of reflux liquid needed to counterbalance the amount of vapor produced in the sump 42. The compressed air conducted through the conduit 50 to the turbine 23 is about one-fifth of the original air and has a temperature corresponding to the condensation temperature at about 75 p. s. i. gauge. The amount of such air is not sufficient to furnish all the refrigeration required and additional air, amounting to about three-fifths of the original air compressed, is supplied to the turbine by the conduit 19. The air through conduit 19 is warmer so that the combined streams passing through the inlet 22 to the turbine have a temperature such that after expansion with the production of external work, the temperature of the expanded air passing through the conduit 24 is substantially equal to the condensation temperature of air at atmospheric pressure and such temperature is only slightly higher than the temperature of the nitrogen containing product discharged through conduit 51. Both the nitrogen containing product and the expanded air can therefore be joined for passage through the liquefier 26 although if desired they could be passed in separate streams. The combined streams of expanded air and nitrogen containing product pass outward through the accumulator 15' and through open valve 30'. In their passage through the accumulator 15', the deposited materials will be largely re-evaporated and carried out. The cold accumulator mass will also be cooled and prepared for the next reversal period.

Of the liquid which is rectified, the liquid oxygen represents about one-fifth, the remainder being a nitrogen product of about 88 percent nitrogen. By employing factors customarily used for such calculations, it can be shown that the volume of air compressed is about 23.4 times the gaseous volume at normal temperature and pressure of the liquid oxygen produced.

Referring now to Fig. 2 which diagrammatically illustrates an embodiment of the invention employing staged expansion devices for the attainment of higher power efficiency, the compressed air is passed through cold accumulators 115 and 115' of a modified construction. The heat exchange masses in the accumulators are divided into three sections, 61, 62, and 63, and 61', 62', and 63', respectively. The accumulators are cross connected by a conduit 64 between the sections 61, 62, and 61', and 62', and also by a conduit 65 between the sections 62, 63, and 62', 63'. An expansion turbine 66 has its inlet 67 connected to the midpoint of the conduit 64 and its discharge 68 connected to the midpoint of the conduit 65. The turbine inlet 67 is preferably provided with a control valve 69. Check valves 70 and 70' are interposed in the conduits 64 to provide flow only toward the inlet 67, and check valves 71 and 71' are interposed in the conduit 65 to permit flow only away from the discharge 68 toward either of the cold accumulators. The turbine 66, when thus connected, will automatically receive compressed air from that accumulator through which the compressed air is passing, will expand such compressed air down to substantially atmospheric pressure, and automatically pass it to that accumulator through which the outgoing expanded air and nitrogen containing product is flowing.

The cooled air from the lower part of the cold accumulators passes by means of branches 18 or 18' through conduit 19, and about two-fifths of it enters the warm end of a liquefying heat exchanger 75 from the lower end of which a conduit 76 conducts the fractionally liquefied portion of such compressed air to the separator 32, the liquid fraction passing through expansion valve 35, filter 34, and transfer line 37 to the upper end of the rectifying column 38. The gas fraction passes from the separator 32 through line 39 to the chamber 40 and after passage through the condenser 41 the compressed air portion remaining in the gas phase passes through the conduit 77 to an inlet connection 78 of a first-stage expansion turbine 79. A portion (about three-fifths) of compressed air is conducted from conduit 19 by connection 80 to the inlet 78 and such conduit may have a control valve 81 therein. The expanded air from turbine 79 passes through a conduit 82 to the cold end of a heat exchange coil 83 within the liquefier 75 to be warmed.

The turbine 79 expands the compressed air from the compression pressure to an intermediate pressure, preferably about 30 p. s. i., between the compression pressure and substantially atmospheric pressure. The warm intermediately expanded air is conducted from the heat exchange coil 83 by a conduit 84 to the inlet of a second-stage expansion turbine 85 which expands to substantially atmospheric pressure. The expanded air from turbine 85 passes by conduit 86 to the cold end of a heat exchange coil 87 also disposed within the liquefier 75 in proper relation to the coil 83 so that countercurrent cooling of the air passing through the liquefier 75 may be effected. The nitrogen containing product of the rectifying column passes through conduit 51 to the discharge conduit 86 of turbine 85. The combined nitrogen product and expanded air then leaves heat exchange coil 87 through a conduit 88 that joins the conduits 27 and 27' at the cold ends of the cold accumulators.

Except for the differences caused by the use of staged low temperature expansion engines and the use of an expansion engine at the warmer levels, the operation of the apparatus of Fig. 2 is very similar to that of Fig. 1. It has been found that improved efficiencies can be obtained by expanding a portion of the compressed air before it has cooled to the low temperature required for the inlet to the low temperature expansion engine. The turbine 66 expands a portion of the compressed air from one cold accumulator to the other, for example, when valve 17 is open and compressed air enters cold accumulator 115, such air is cooled by section 61 about one-third of the total cooling obtained by passage through the whole accumulator. A portion thereof passes through the check valve 70 and control valve 69 into the turbine 66 which expands it from the compression pressure of about 75 p. s. i. to substantially atmospheric pressure. Such expanded air passes from the discharge 68 through check valve 71' into the cold accumulator 115' below the middle section 62'. Such expanded air has a temperature which is the same as the temperature at that level of the cold accumulator, and such air joins the outflowing expanded air and nitrogen product. This adds refrigeration to the cold accumulator 115' at a temperature level where the expansion with the production of external work is quite efficient. Upon the reversal of the regenerators, such refrigeration is taken up by inflowing compressed air and the flow of compressed air through the turbine 66 is then from accumulator 115' to accumulator 115.

The remaining major portion of the cold compressed air that passes from the cold ends of the regenerators through check valve 21 or 21' is divided into two parts, about two-fifths flowing from conduit 19 through the liquefying heat exchanger 75. Such portion is partly liquefied by heat exchange with the coils 87 and 83, and the liquid fraction is separated from the gaseous fraction by the separator 32. As previously explained, the liquid fraction is filtered to remove residual solid particles of impurities before passage into the rectifying column 38 as a reflux liquid. The gas fraction passes through the condenser 41 and the uncondensed portion (about one-fifth) passes out through conduit 77 through the inlet 78 of the first-stage turbine 79. About three-fifths of the compressed air coming from the cold accumulator passes through conduit 80 to the inlet 78 of expansion turbine 79. Thus about four-fifths of the compressed air from the accumulators is expanded in the turbine 79 from a pressure of about 75 p. s. i. to a pressure of about 30 p. s. i. with a temperature reduction to about 91° K. Such partly expanded air is then warmed in the heat exchanger coil 83 to a temperature of about 100° K. and further expanded by the turbine 85 to substantially atmospheric pressure which reduces the temperature thereof to about 79° K. The completely expanded air combined with the nitrogen containing product of rectification is warmed in the heat exchange coil 87 to about 100° K. and passed into the cold end of an accumulator.

It will be seen that the division of the expansion of the air into two stages provides all the resulting refrigeration in the temperature range between 79° K. and 100° K. in which temperature range it is useful for taking up latent heat and liquefying the compressed air. The employment of the expansion turbine 66 makes it possible to expand less air in the turbines 79 and 85. The refrigeration produced by the expansion in the turbine 66 at the higher temperature levels is most efficiently used for desuperheating the air, while if no turbine 66 were used, some of the refrigeration produced by the turbines 79 and 85 would be used for desuperheating the air which would be less efficient than the arrangement employing the single expansion turbine shown in Fig. 1. The interstage warm-up from 91° K. to 100° K. of the partly expanded air represents refrigeration gained at the low temperature levels effected by employing staged expansions instead of a single expansion. On the basis of the same assumptions used in the calculations for the cycle of Fig. 1, it may be shown that the total air volume compressed is reduced to about 20 times the gaseous volume at normal temperature and pressure of the liquid oxygen produced.

The efficiency of the expansion motor or motors used obviously has a considerable effect on the power required per unit of oxygen produced. The factors employed for comparison included in both cases, a conservative expansion turbine refrigeration efficiency of 75 percent.

It will be seen that a cycle for the production of liquid oxygen from air has been provided which does not require the compression of any of the air to pressures above 125 p. s. i. or preferably not above 75 p. s. i. so that full advantage can be taken of the desirable features of rotary compression and expansion devices without at the same time requiring the use of complicated heat exchangers. A further important advantage of the invention results from the elimination of a countercurrent heat exchanger of large air flow capacity by permitting direct heat exchange by admixture of a pressure product discharged from the condenser tubes 41 with a portion of the air to be expanded in expansion turbine 23 or 79.

Another important advantage is that the cycle permits use of a relatively simple type of rectifying column as indicated diagrammatically by the column 38 while producing pure liquid oxygen. This result is attained because the liquid condensed from the air passing through tubes 41 and collected in chamber 40 is considerably enriched in oxygen and is therefore quite easily rectified to produce pure oxygen in the column 38. It is contemplated however that the column 38 is in effect a two-stage rectifying column and that gas and liquid contact elements can be employed below the condenser 41 to enhance the rectifying action as in customary types of two-stage rectifying columns. The use of staged expansion turbines as shown in Fig. 2 provides added advantages by effecting an increased power consumption efficiency.

Although preferred embodiments of the invention have been described in detail, it is contemplated that modifications of the process and the apparatus may be made and that some features may be employed without others all within the spirit of the invention and the scope thereof as set forth in the claims. The invention has been described in connection with the separation of air to produce liquid oxygen but it should be understood that the principles of the invention may be applied to the separation of low boiling point gas mixtures of similar nature to air.

What is claimed is:

1. A process for separating a gas mixture which comprises providing a stream of the mixture at a condensation pressure below 125 p. s. i., substantially freed of all moisture, and cooled to a relatively low temperature; liquefying minor fractions of said cooled mixture under pressure; expanding and rectifying at a relatively low pressure all of such liquefied fractions to separate a product comprising a higher boiling point component and a product comprising mainly a lower boiling point component; expanding with the production of external work all of the unliquefied remainder of said cooled mixture to said low pressure for producing low temperature refrigeration; and effecting successive heat exchanges for utilizing said low temperature refrigeration and the refrigeration of said product comprising mainly the lower boiling component first to effect a portion of said liquefaction under pressure and secondly for cooling the compressed mixture.

2. A process for separating a gas mixture according to claim 1, which includes the steps of separately collecting the first of the liquefied fractions, which fraction contains impurities having higher boiling points than the components of the gas mixture; separating and removing such impurities from the collected liquid fraction; and then passing the cleaned fraction to the rectification for use as a reflux liquid.

3. A process for separating a gas mixture according to claim 1, in which said expansion with external work is effected in successive stages, the partly expanded mixture between stages being warmed by heat exchange with portions of mixture to be cooled.

4. A process for separating a gas mixture according to claim 1 which includes the steps of expanding with the production of external work a portion of partly cooled compressed mixture to cool such portion to a lower temperature; and effecting heat exchange to such expanded portion from incoming compressed mixture to utilize the refrigeration of said expanded portion for cooling compressed mixture at relatively higher temperature levels whereby improved power economy is obtained.

5. A process for separating a gas mixture which is compressed to a pressure between about 70 to 125 p. s. i., is substantially free of all moisture, and cooled to a relatively low temperature, which process comprises liquefying a relatively small portion of said cooled mixture to provide a first liquid fraction; separately expanding such first liquid fraction; utilizing at least the refrigeration thereof in the rectification of a second fraction of said mixture in a rectifying zone; liquefying a further portion of said cooled mixture by heat exchange with the higher boiling point product of rectification to provide said second fraction; expanding the unliquefied remainder of said mixture with the production of external work to a low pressure; and effecting countercurrent heat exchanges for using a portion of the refrigeration of said expansion for liquefying said small portion of said cooled mixture and the balance for cooling said mixture.

6. A process for separating a gas mixture according to claim 5, which includes the steps of cooling the higher boiling product of the rectification by heat exchange with the lower boiling product of the rectification to produce a subcooled liquid product.

7. A process for separating a gas mixture according to claim 5, which includes the steps of separating impurities from said first fraction after the expansion thereof; and passing such expanded and cleaned material to the rectifying zone for use as a reflux liquid.

8. A process for separating a gas mixture which is compressed to a pressure of between about 70 and 125 p. s. i., is substantially free of all moisture and cooled to a relatively low temperature above the condensation temperature of the components of the mixture, which process comprises subjecting one portion of such cooled mixture to low temperature heat exchange to partially liquefy it and produce a first liquid fraction; separating the vapor from said liquid fraction; liquefying a portion of such separated vapor to form another liquid fraction; rectifying the liquid fractions at a lower pressure to produce a product comprising the higher boiling component and an effluent including lower boiling component; admixing a second portion of said cooled mixture with the balance of such separated vapor to superheat the vapor sufficiently to avoid excessive condensation upon expansion; expanding with the production of external work the second portion of the mixture and such separated vapor to a low pressure for producing low temperature refrigeration; and utilizing part of said refrigeration and the refrigeration of said effluent for effecting said low temperature heat exchange with the one portion of the mixture that produces the first liquid fraction, and the remainder of the refrigeration for cooling incoming gas mixtures.

9. A process for separating air which comprises compressing the air to a pressure between 70 and 125 p. s. i.; cooling and drying said air by passage in contact with a previously cooled heat storage mass; dividing said cooled air into approximately two-fifths and three-fifths portions; partly liquefying said two-fifths portion and separating the liquid fraction therefrom; expanding and rectifying said liquid fraction; producing a second liquid fraction by effecting heat exchange between the gaseous remainder of said two-fifths portion and a higher boiling product of rectification in a rectifying zone to produce vapors for the rectification; expanding said second liquid fraction and using it for reflux liquid in said rectifying zone; combining the remainder of said two-fifths portion and amounting to approximately one-fifth of said cooled air with said three-fifths portion; expanding said combined remainder and three-fifths portion with production of external work to a low pressure; effecting indirect heat exchange between said two-fifths portion and such work-expanded mixture to produce said first-mentioned liquid fraction; and thereafter cooling a heat storage mass with such work-expanded mixture and with the nitrogen containing product of the rectification.

10. A process for separating a gas mixture according to claim 9, which includes the step of combining said nitrogen containing product of rectification with such expanded mixture prior to said indirect heat exchange.

11. A process for separating air according to claim 9, which includes the steps of scrubbing the gaseous fraction of said two-fifths portion with the liquid fraction thereof prior to said separation; and filtering solid impurities from said liquid fraction after its said expansion and prior to said rectification.

12. A process for separating air according to claim 9, which includes the steps of withdrawing a partly cooled portion of said compressed air from said previously cooled heat storage mass; expanding said portion with the production of external work; and using the refrigeration of such expansion for cooling another heat storage mass.

13. A process for separating air according to claim 9, in which said expansion with external work is effected in two stages, the partly expanded mixture between the stages of expansion being warmed by heat exchange with said two-fifths portion.

14. In a process for the low temperature separation of air to produce liquid oxygen in which a portion of the compressed, dried, and cooled air is liquefied by heat exchange with a major portion of the cooled air that has been expanded with the production of external work, the steps comprising; effecting such work-expansion in a plurality of successive stages in a manner such that all of said major portion is successively expanded and utilized to cool compressed air; and warming the partly expanded air between such stages and the completely expanded air by heat exchange with said portion of air being liquefied.

15. In a process for separating air according to claim 14, the further step of extracting superheat from both the major portion that is to be work-expanded and the portion that is to be liquefied by heat exchange with still another portion of partly cooled compressed air which has been separately expanded with the production of external work.

16. In a process for the low temperature separation of air to produce liquid oxygen in which a minor portion of the compressed, dried, and cooled air is liquefied by heat exchange with a major portion of the cooled air that has been expanded with the production of external work, the steps comprising; extracting superheat from both the major portion that is to be work-expanded and the minor portion that is to be liquefied by heat exchange with still another portion of partly cooled compressed air which has been separately expanded with the production of external work.

17. In a process for separating a gas mixture which is compressed to a pressure of between about 70 and 125 p. s. i., is substantially free of all moisture, and cooled to a relatively low temperature above the condensation temperature of the components of the mixture to be separated, the steps comprising further cooling and partly liquefying said cooled mixture; separating the thus produced first liquid fraction from the gaseous remainder of the mixture; expanding and utilizing said liquid fraction for rectification in a rectifying zone; liquefying a second fraction of said mixture by heat exchange between said remainder and a higher boiling product of said rectification to produce vapors for the rectification; passing said second liquid fraction to said rectifying zone for use as a reflux liquid; expanding the gaseous remainder of the mixture with production of external work; and effecting heat exchange to such expanded remainder from the cooled compressed mixture for using the low temperature refrigeration produced by such work-expansion to produce, in part at least, said first-mentioned liquid fraction.

18. In a process for separating a gas mixture according to claim 17, the steps of filtering said first liquid fraction after expansion, and passing same directly to said rectification.

19. In a process for separating a gas mixture according to claim 17, the steps of combining the lower boiling gaseous product of the rectification with said work-expanded gaseous remainder, and countercurrently cooling the compressed mixture with such combination.

20. In a process for separating a gas mixture according to claim 17, the steps of by-passing and adding a substantial portion of cooled gas mixture to admix with said gaseous remainder for regulating the temperature of said gaseous remainder before it is work-expanded in combination with such added portion.

21. A system for producing liquid oxygen from air comprising a rectifying device having a high pressure first chamber and a low pressure rectifying chamber; a rotary compression means for supplying air compressed to the pressure of the first chamber of said rectifying device; cold accumulators for cooling such compressed air; means for dividing such cooled air into larger and smaller portions; means for directly cooling the larger portion with a colder gaseous product drawn from the first chamber of said rectifying device; expansion motor means for expanding with the production of external work said larger portion to a low pressure and substantially dry saturated condition; means for admixing such expanded larger portion with a nitrogen containing product from said rectifying device to form a combined outflow mixture; a heat exchanger of the indirect type for warming said outflow mixture; means for passing said warmed outflow mixture to said cold accumulators; means for passing said smaller portion through said indirect heat exchanger to partially liquefy same and produce a first liquid fraction; means for passing said smaller portion to said first chamber for effecting heat exchange between an oxygen product of said low pressure chamber and said smaller portion to produce a second liquid fraction; means for withdrawing the gaseous remainder of said smaller portion from said first chamber as said cold product of low pressure chamber; and means for passing the first and second liquid fractions to the second-stage for rectification therein to form said nitrogen containing product and said liquid oxygen product.

22. In a system for producing liquid oxygen from air including a rectifying device having a low pressure rectifying chamber and a high pressure chamber in heat exchange relation with an oxygen containing liquid collected at the lower end of said rectifying chamber, means for compressing air at least to the pressure of said high pressure chamber, and heat exchange means for cooling the compressed air by heat exchange with outflowing low pressure gaseous material, means for dividing said cooled air into first and second portions; expansion motor means for expanding said first portion with the production of external work; means for effecting heat exchange between said expanded first portion and said second portion to partially liquefy the same, and produce liquid and gaseous fractions; means for passing the gaseous fraction at least of said second portion to said high pressure chamber for heat exchange with liquid rich in oxygen produced in said rectifying chamber to form a liquid fraction and a gaseous remainder; means for transferring said liquid fractions to said rectifying chamber for rectification; means for passing said gaseous remainder to said expansion motor means for expansion; and means for passing the expanded first portion and said expanded remainder of the second portion to said heat-exchange means for cooling compressed air.

23. In a system for producing liquid oxygen according to claim 22, means for passing a nitrogen containing product from said rectifying device in heat-exchange relation to the oxygen product of said rectifying device for producing subcooled liquid oxygen.

24. In a system for producing liquid oxygen according to claim 22, means for effecting heat exchange between a nitrogen containing product from said rectifying device and said second portion to liquefy a fraction thereof in cooperation with the expanded first portion and expanded remainder.

25. In a system for producing liquid oxygen according to claim 22, means for admixing said first portion with said gaseous remainder prior to expansion; an indirect heat exchanger for effecting heat exchange between said combined and expanded first portion and remainder and said second portion to liquefy a fraction thereof.

26. In a system for producing liquid oxygen according to claim 22, in which said expansion motor means comprises two stages in series; a heating means for utilizing a portion of the refrigeration of the intermediately expanded air arranged to cool said second portion.

27. In an apparatus for the production of a liquefied gas product of separation of a gas mixture including a low temperature rectifying means, means for supplying said mixture at a pressure between 125 and 70 p. s. i.; a pair of cold accumulators for cooling the compressed mixture to a low temperature when flowing alternately therethrough; means for dividing the cooled mixture into major and minor portions; expansion motor means for expanding the cooled major portion to a low pressure; an indirect heat exchanger for effecting heat exchange between said expanded major portion and said minor portion to liquefy at least a portion thereof; means for passing said minor portion to the rectifying means for production of said liquefied gas; means for passing expanded gas mixture and gaseous product of rectification to said cold accumulators for outflow alternately therethrough; and expansion motor means connected between said cold accumulators and connected to expand mixture from an intermediate part of the one cold accumulator through which the compressed mixture is passing and deliver expanded mixture to a colder zone of the other cold accumulator.

28. A process for separating a gas mixture which comprises providing a supply of the mixture at a condensation pressure below 125 p. s. i., freed of moisture, and cooled to a low temperature; subjecting portions of said cooled mixture under pressure to successive low temperature heat exchanges to produce liquid fractions thereof and a cold gaseous remainder; separately expanding the liquid fractions to a relatively low pressure for rectification and passing the expanded liquid fractions to a rectification zone for producing separation products; warming the cold gaseous remainder, expanding such warmed remainder with the production of external work to at least the pressure of said rectification zone to produce cold vapor, the amount of said warming being adjusted so that said cold vapor is in a dry and saturated state at the pressure of expansion; and effecting countercurrent heat exchanges for using part of the refrigeration of such work expansion vapor and the refrigeration of the lower boiling point separation product for effecting at least the first of said low temperature heat exchanges and the balance for cooling said gas mixture.

29. A process for separating a gas mixture such as air which comprises providing a first stream of the mixture at a condensation pressure below 125 p. s. i., freed of moisture, and cooled to a low temperature; liquefying fractions of said cooled first stream and providing a cold gaseous remainder; separately expanding the liquid fractions to a low pressure for rectification and passing same to a rectification zone for producing separation products; providing a second stream of the mixture at the said condensation pressure, freed of moisture, and at a temperature higher than that of said first stream; admixing said second stream with said cold gaseous remainder; expanding with the production of external work the combined second stream and remainder to at least the pressure of the rectification zone for producing low temperature refrigeration; effecting countercurrent heat exchanges for using part of the refrigeration of such work expansion and the refrigeration of the lower boiling point separation product for effecting at least the initial partial liquefaction of said first stream and the balance for cooling incoming gas mixture.

30. A process for separating a gas mixture according to claim 29 in which the amounts and temperatures of said second stream and said cold gaseous remainder are so proportioned that the said work expansion thereof produces cold vapor in a dry and saturated state.

EDWARD F. YENDALL.
GEORGE H. ZENNER.

REFERENCES CITED

The following references are of record in the file of this patent:

UNITED STATES PATENTS

| Number | Name | Date |
|---|---|---|
| 1,283,472 | Crommett | Nov. 5, 1918 |
| 1,304,027 | Crommett | May 20, 1919 |
| 1,626,345 | LeRouge | Apr. 26, 1927 |